United States Patent [19]  [11] 4,320,991
Rogers  [45] Mar. 23, 1982

[54] INFLATABLE EQUIPMENT FOR USE AS A BOUYANT BOOM

[76] Inventor: Bernard T. Rogers, Ross-Shire, Braes, Ullapool, Scotland

[21] Appl. No.: 43,160

[22] Filed: May 29, 1979

[30] Foreign Application Priority Data

May 31, 1978 [GB] United Kingdom ............... 25052/78

[51] Int. Cl.³ .......................... E02B 3/00; E02B 15/04
[52] U.S. Cl. ......................................... 405/68; 405/72
[58] Field of Search ................................... 405/63–72; 210/922, 923

[56] References Cited

U.S. PATENT DOCUMENTS

| | | | |
|---|---|---|---|
| 3,067,712 | 12/1962 | Doerpinghaus | 405/210 |
| 3,221,884 | 12/1965 | Muller | 210/DIG. 25 |
| 3,563,036 | 2/1971 | Smith et al. | 405/69 |
| 3,565,257 | 2/1971 | Cavalieri | 405/63 X |
| 3,685,297 | 8/1972 | Juodis et al. | 405/68 |
| 3,859,796 | 1/1975 | Benson | 405/68 X |
| 4,030,304 | 6/1977 | West | 405/72 X |
| 4,049,170 | 9/1977 | Kawakami et al. | 405/66 X |
| 4,124,981 | 11/1978 | Preus | 405/72 X |
| 4,201,495 | 5/1980 | Preus | 405/63 |

FOREIGN PATENT DOCUMENTS

| | | |
|---|---|---|
| 902514 | 8/1962 | United Kingdom ................. 405/72 |
| 1028470 | 5/1966 | United Kingdom . |
| 1210690 | 10/1970 | United Kingdom . |
| 1278938 | 6/1972 | United Kingdom . |
| 1253610 | 11/1971 | United Kingdom . |
| 1291321 | 10/1972 | United Kingdom . |
| 1365870 | 9/1974 | United Kingdom . |
| 1310398 | 3/1973 | United Kingdom . |
| 1340742 | 12/1973 | United Kingdom . |
| 1383315 | 2/1975 | United Kingdom . |
| 1243176 | 8/1971 | United Kingdom . |
| 1372410 | 10/1974 | United Kingdom . |
| 1387123 | 3/1975 | United Kingdom . |
| 1336830 | 11/1973 | United Kingdom . |
| 1460155 | 12/1976 | United Kingdom . |
| 1471475 | 4/1977 | United Kingdom . |
| 1480258 | 7/1977 | United Kingdom . |
| 1475829 | 6/1977 | United Kingdom . |

Primary Examiner—Dennis L. Taylor
Attorney, Agent, or Firm—Ostrolenk, Faber, Gerb & Soffen

[57] ABSTRACT

Elongate floatable equipment for use as a bouyant barrier for encircling or partially enclosing a spillage of oil, debris or other floating matter comprising hollow inflatable bouyancy units arranged in a row end to end within a sleeve which is formed by a tubular casing of deformable material. The tubular casing comprises an inner layer of a fibrous water absorbent material which is encased within an outer layer formed from a net of a high tensile filamentary material. The net layer comprises an axially-spaced series of circumferential hoops interlinked by zig zag strands that run from end to end of the casing, the hoops and zig zag strands together forming a geodetic pattern mesh. A skirt is laced to the net layer of the casing in a zig zag pattern along the casing.

19 Claims, 11 Drawing Figures

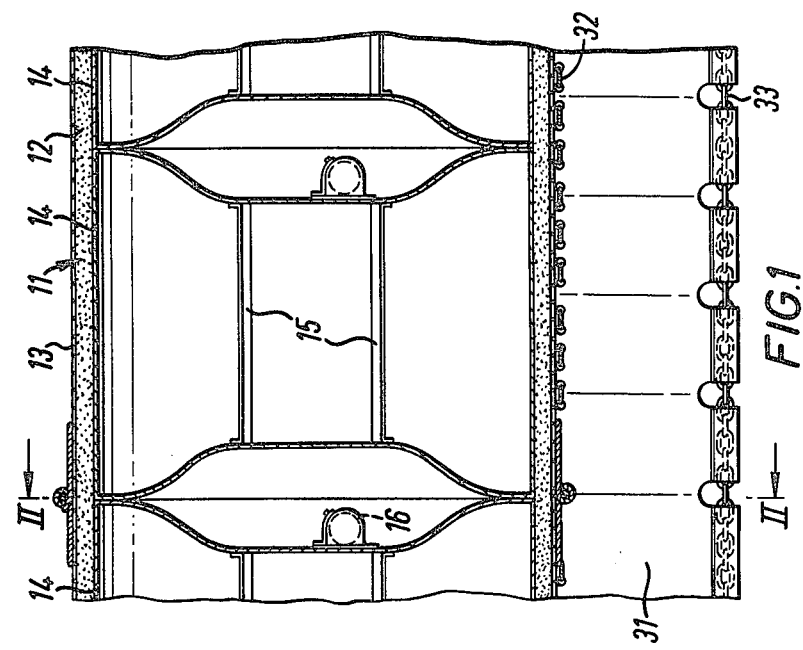
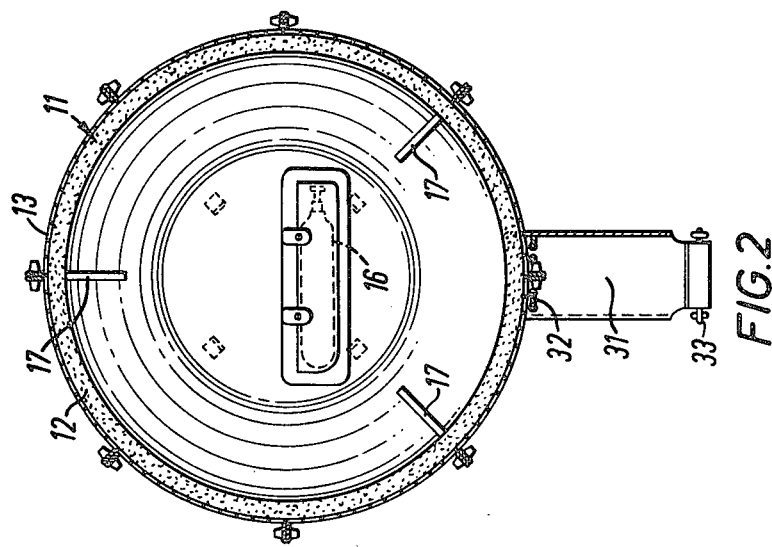

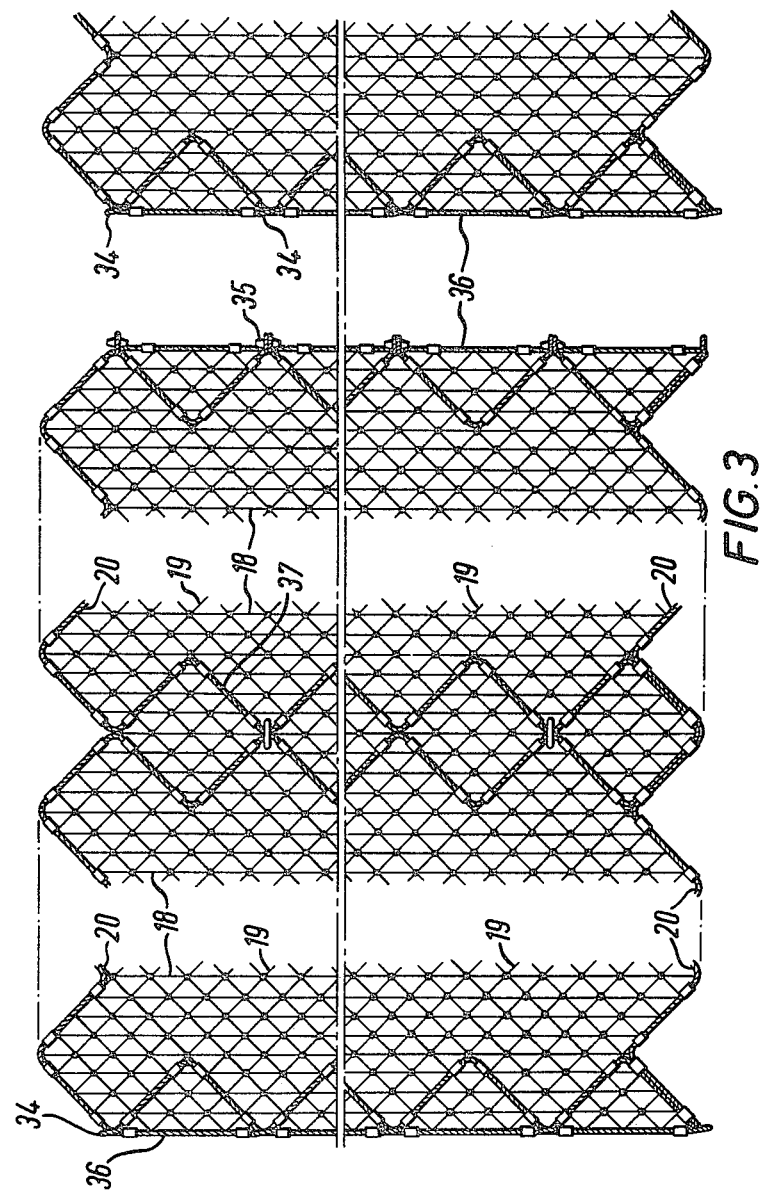

INFLATABLE EQUIPMENT FOR USE AS A BOUYANT BOOM

This invention relates to elongate floatable equipment which floats on the surface of a stretch of water, when being used.

Such equipment may be used as a buoyant barrier for encircling or partially enclosing a spillage of oil, debris or other floating matter spilled or discharged from a vessel, a sea-board structure, a coastal or other shore-based unit. Inflated hose of a considerable length has been used for this purpose. However, it has only served as an adequate floating barrier for containing floating oil in very confined waters in substantially flat calm surface water conditions. Such a barrier is generally not adequate for retaining or containing oil spillages in tidal or rough water conditions.

An object of this invention is to provide elongate floatable equipment which will float on the surface of a stretch of water and be in contact with, but not wholly immersed in, the water throughout its length even when the nature of that surface is constantly changing such as occurs other than in very flat calm conditions and tideways.

According to this invention there is provided elongate floatable equipment comprising hollow inflatable buoyancy units of a flexible impervious material which are arranged in a row, end to end, within a sleeve which comprises a tubular casing of deformable material. Such equipment may form an elongate barrier section when each of the buoyancy units is inflated and the construction allows for a certain amount of lateral deformation of that buoyancy section at and around the abutting ends of each juxtaposed pair of buoyancy units, in a manner similar to the construction of a vertabrae as well as a certain amount of longitudinal deformation of the tubular casing.

Preferably the tubular casing comprises a layer formed from a net of a high tensile filamentary material. The net layer may be a multi-strand net comprising an axially-spaced series of circumferential hoops interlinked by other strands which, together with the strands that form the hoops, are arranged in a geodetic form, whereby radial expansion of the tubular casing is limited by the hoops, whilst radial contraction of the casing with proportionate increase in the length of the casing and radial expansion of the casing to the limited extent allowed by the hoops with proportionate decrease in the length of the casing are allowed. Conveniently, the net layer is equipped with lacing means whereby it can be opened longitudinally to facilitate removal of the buoyancy units.

It is desirable for steps to be taken to achieve partial immersion of elongate floatable equipment in which this invention is embodied and which is for use as a buoyant barrier, because, in windy conditions when surface water conditions are choppy and rough, or when a swell is running, there is a tendency for such a barrier to float upon a surface layer of oil that is floating on the water and which is intended to be confined by the barrier. With this requirement in mind I prefer to form the tubular casing so that it also comprises an inner tubular layer of a fibrous water absorbent material which is encased within the net which comprises an outer layer of the tubular casing.

Conveniently the equipment includes a lining of low friction material between the buoyancy units and the tubular casing.

Two or more of the elongate barrier sections may be joined together end to end to form a longer floating barrier. The or each barrier section may be prepacked for emergency or contingency use and may be equipped with automatically actuable inflation apparatus which becomes effective to inflate the inflatable units when the respective barrier section is launched.

The or each barrier section may be provided with a depending skirt which is fitted in a zig-zag pattern along the bottom.

A preferred embodiment of this invention will be described now by way of example with reference to the accompanying drawings, of which:

FIG. 1 is a longitudinal section of a typical fragment of a buoyant barrier section in which this invention is embodied;

FIG. 2 is a section on the line II—II in FIG. 1;

FIG. 3 is a plan view of the outer net layer of a typical buoyant barrier section in which this invention is embodied, laid out flat and partly broken away for convenience and showing fastening means at the ends and between those ends, and a similar view of a fragmentary end piece of the outer net layer of another similar buoyant barrier section;

Figure 4:
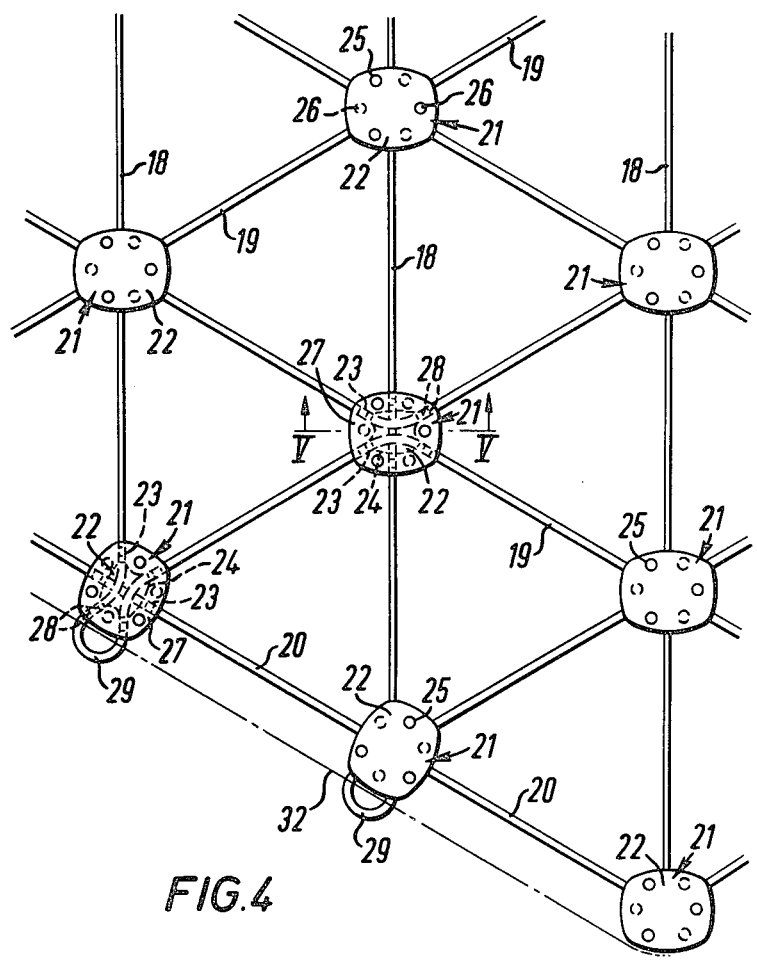
FIG. 4 is a fragment of the net layer shown in FIG. 3 drawn to a larger scale.

Referring to FIGS. 1 and 2 of the drawings, a buoyant barrier section comprises a tube 11 of protective material, which in this example is approximately 100 meters long x 1.1 meters in diameter. The tube 11 comprises an inner layer 12 of fibrous material, such as animal hair, which is bonded into a loose flexible mat, and an outer layer 13 which encases the inner layer 12. Conveniently the thickness of the mat is of the order of 50 mm. Anti-fungicidal and fire retardent ingredients are incorporated in the flexible bonding means that bonds the fibrous material into the mat in order to obviate deterioration during storage. The outer layer 13 is preferably constructed from high tensile multi-strand plastic coated wire, but galvanized wire or other suitable netting material may be used.

The tube 11 is a sleeve within which cylindrical buoyancy units 14 are contained end to end. The inner layer 12 of the tube 11 is lined with a low friction plastic material. Each bouyancy unit 14 is constructed of a flexible impervious material such as reinforced neoprene, polyvinylchloride, Hyperlon, Butyl or polyurethane. The end walls of each unit 14 are joined together by straps 15 within the unit 14. The straps 15 are shorter than the axial length of the cylindrical wall of the unit 14. Hence, whilst each juxtaposed pair of units 14 abut one another at the peripheral portions of their end walls, the central portions of the adjacent end walls are spaced apart so that a cavity is formed between each juxtaposed pair of units 14.

Each buoyancy unit 14 is equipped with a compressed air or $CO_2$ cylinder 16 which is mounted on the end wall at one end of that unit 14 within the cavity between that unit 14 and the juxtaposed unit 14 at that end. The gas outlet of each cylinder 16 communicates with the interior of the respective buoyancy unit 14 via a suitable tube (not shown) which passes through the wall of that unit 14. Each cylinder 16 is equipped with a pull-cord emergency operating valve.

Tubes 17 project into each cavity between each juxtaposed pair of buoyancy units 14. Each tube 17 passes through the tube 11 and places the respective cavity in communication with the outside of the buoyant barrier section.

Figure 5:
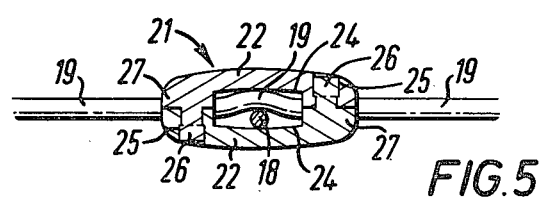
FIG. 5 is a section on the line V—V in FIG. 4 of a detail of the net section shown in FIG. 4.

The construction of the high tensile multi-strand wire net of the layer 13 is illustrated in FIGS. 3, 4 and 5. The layer 13 is formed by joining together the longitudinal edges of a generally rectangular net which is shown laid out flat in FIG. 3. The net is specially constructed to comprise a series of parallel straight strands 18 of plastic coated wire which extend across the full width of the net substantially normal to the longitudinal axis of the net and other zig-zag strands 19 of plastic coated wire which extend along the full length of the net. The strands 18 and 19 interlink to form a mesh with triangular interstices which are substantially equilateral triangles when the form of the net is that to which it is urged by its inherent resilience. The strands 18 and 19 are joined together at the apices of the triangular interstices. The longitudinal edges of the net are formed by zig-zag plastic coated wires 20, and the distance between each turn of each wire 20 is approximately four times the distance between each turn of the zig-zag strands 19. The zig-zag patterns of the two longitudinal edges are complementary so that, when they are joined together to form the tubular layer 13, the joint formed between them follows a zig-zag path along that tube.

The form of the joints 21 at the apices of the triangular interstices of the net is illustrated in FIGS. 4 and 5. Each joint 21 is a two piece self-locking joint. The two pieces 22 of each joint 21 are identical plastics molding which are fitted together face to face. The mating faces of the pieces 22 of each joint 21 are recessed centrally and formed with grooves 23 which radiate from that recess 24 and receive respective lengths of the plastic coated wire strands 18, 19 or 20 that are joined by the joint 21. Each joint piece 22 has three holes 25 and three headed dowels 26 which are formed alternately around the peripheral wall portion 27 of that joint piece 22 that surrounds the central recess 24 of that joint piece 22. Each hole 25 is rebated at its outer end. Axially spaced ridges 28 are formed in each of the grooves 23. When each joint 21 is assembled, its two pieces 22 are pressed together so that the headed dowels 26 of each joint piece 22 are snap fitted into opposed ones of the holes 25 formed in the other joint piece 22. The ridges 28 in each groove 23 bite into the plastic coating of the strand 18, 19, 20 that is received in that groove 23. The strand 18 and either the strand 19 or the edge wire 20 or both that are joined by each joint 21 are clamped together between the two parts 22 of that joint 21, as is shown in FIG. 5.

The strands 18 and 19, which are joined together at each of the three joints 21 that are provided at spaced intervals along each leg of the zig-zag edge wires 20 that run between each adjacent pair of turns in the respective wire 20, are formed by a respective continuous length of plastic coated wire which also forms a loop 29 on the opposite side of that joint 21. The loops 29 along the zig-zag edges of the net are used as eyes by which those two edges are laced together to form the longitudinally-extending zig-zag joint of the tubular net layer 13.

The ends of the strands 18 at the turns of each zig-zag edge wire 20 are clamped to that wire 20 by the joint 21 at that turn. Those strands 18 may be enlarged at their ends, the enlarged ends being trapped within the cavity that is formed within the respective joint 21 by the recesses 24 of its joint pieces 22.

The tubular net layer 13 has two characteristics which follow from the form of the net from which it is constructed. Firstly its pattern is a geodetic network in form. Secondly the ends of the straight strands 18 are effectively joined together by the joining together of the zig-zag longitudinal edges formed by the wires 20. Hence the straight strands 18 function as an axially-spaced series of circumferential hoops which limit radial expansion of the tubular net layer 13 whilst, because the lengths of each straight strand 18 between adjacent pairs of mesh joints 21 can buckle, radial contraction of the tubular net layer 13 with proportionate increase in the length of that tube can occur.

FIGS. 1 and 2 show that the buoyant barrier section has a skirt 31 which depends from the tube 11. The upper edge of the skirt 31 is laced to the outer net layer 13 by the lacing rope 32 that laces the two zig-zag longitudinal edges of the net together to form the tubular layer 13. Hence the skirt 31 will depend from the tube 11 in a zig-zag pattern since its upper edge follows the longitudinally-extending zig-zag joint of the outer net layer 13. The lower edge of the skirt 31 is fitted with a ballast chain 33.

Figure 6:
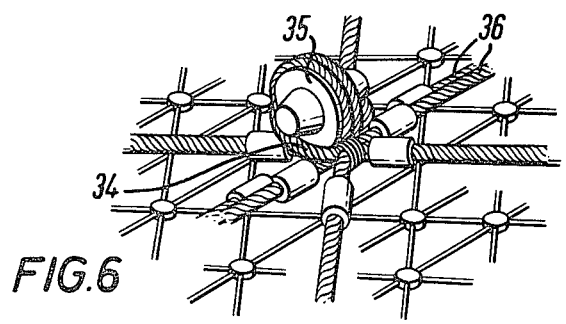
FIGS. 6 and 7 are perspective views illustrating a typical fastening between juxtaposed buoyant barrier sections.
Figure 7:
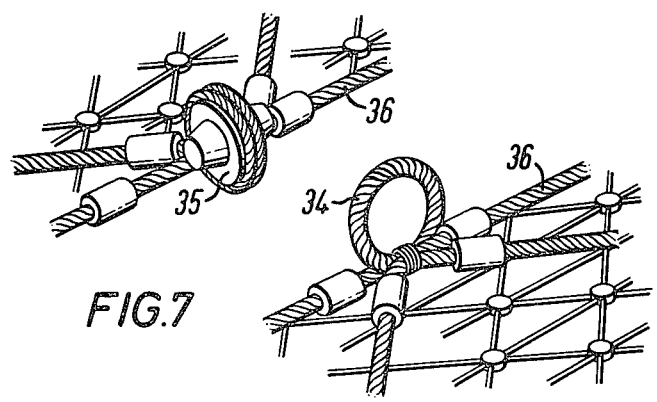
Figure 8:
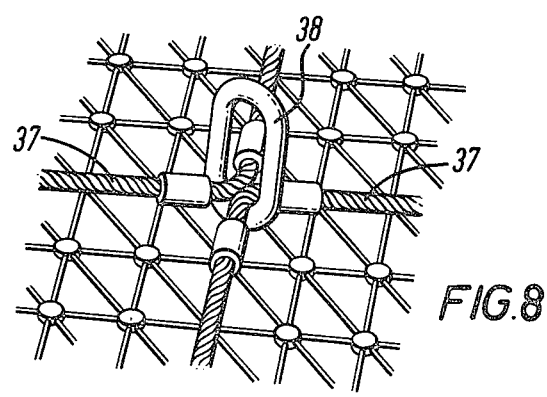
FIG. 8 is a perspective view of a fastening carried by the outer net layer between its ends.

Formation of the longitudinally extending zig-zag joint by lacing enables the structure to be opened longitudinally thus facilitating the removal of the buoyancy units 14 and the protective fiber mat layer 12. Any number of barrier sections, which in this example are 100 meters long but may be of other dimensions, may be coupled together as shown in FIGS. 6 and 7, by a series of loops 34 and toggles 35 which are provided around the periphery of the ends of the outer layer 13 as shown in FIG. 3. The loops 34 and toggles 35 are mounted on a wire rope 36 which in turn is mounted on the net of the layer 13 in a way that the joint may equal the tensional strength of the net layer 13. At predetermined intervals along the length of the cylindrical net layer 13 further wire ropes 37 encircle the tube 11 and are specially laced into the net of the layer 13 for the purposes of attaching mooring or securing rings 38 (see FIG. 8).

Figure 9:
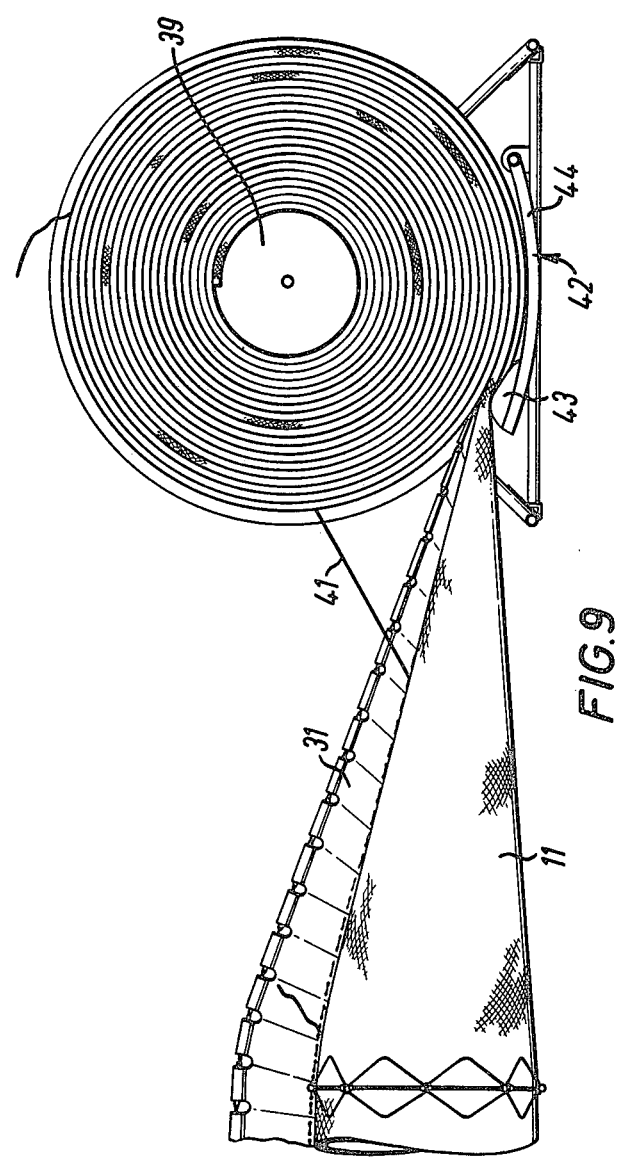
FIG. 9 is a side elevation of the buoyant barrier section shown in FIGS. 1 to 8 stowed in a stowage reel and joined at its end to another such barrier section.

The barrier section, including its skirt 31, when packed for emergency or contingency use, as shown in FIG. 9, is flattened to form a continuous belt-like structure which in width will be equal to half the circumference of the appliance when in use. The structure in this flattened form is rolled onto a purpose designed reel 39 of such a diameter that the whole of the flattened barrier section will be accommodated within the external diameter of the reel 39. It is more convenient for the barrier section to be rolled onto the reel 39 upside-down with its skirt 31 uppermost. In packing, the cords 41 of the cylinder valves of all the buoyant units 14, except that at one end of the tube 11, are led through the fibrous mat layer 12 and through the outer layer 13, and are attached to another part of the outer net layer 13.

The pull cord that is not led through the fibrous mat layer 12 and the outer layer 13 is at the end of the tube 11 at which the toggles 35 are located. Those toggles 35 and that pull cord are interengaged with a slotted plate on the drum of the reel 39.

To accomplish the packing, all air or gases are excluded from the buoyancy units 14 and a pressure mechanism 42, which comprises a pressure pad 43 at one end of a spring loaded arm 44 which is pivoted to cause the pressure pad 43 to move radially inwards to the drum centre, exerts a pressure onto the fibrous protective mat 13 which reduces its bulk to approximately 50% of that in its uncompressed form, enabling economic use of the drum capacity.

The pressure mechanism 42 also acts as a device which prevents unintentional unrolling and also overrunning when the apparatus is intentionally rolled off the drum 39. A special consideration of the packing is that of accommodating the compressed air or gas cylinders 16 that are provided for each buoyancy unit 14.

Each cylinder 16 is approximately 100 mm in diameter and it will be noted this measurement exceeds that of the packed thickness of the barrier section. Provision to accommodate this diameter is facilitated by the fact that even under the packed pressure, the fibrous mat material enclosing the cylinders 16 may indent itself into the adjacent inner and outer layers of the other sections of the barrier section thus providing adequate packing accommodation.

The equipment behaves in the following manner when unrolled. At the commencement of the unrolling, the first of the cords 41 attached to the valves of the air or gas cylinder 16 will be tensioned. As the unrolling proceeds that cord 41 will actuate the respective cylinder valve and then be broken. The unrolling may proceed as required and each buoyancy unit 14 will be inflated in the manner described.

The correct inflation pressure is achieved by the air or gas cylinders 16 being of a pre-determined size so as to allow for a predetermined pressure to be created when their contents are decanted. The pressure may be 2 lbs per square inch in one instance but could be lesser or greater in other instances. As each buoyancy unit 14 inflates, the fibrous most layer 12 surrounding its outer cylindrical form will also take up a cylindrical shape and will become firmly trapped between the buoyancy unit 14 and the outer netting layer 13. The maximum diameter to which each buoyancy unit 14 can be inflated is determined by the constraining effect of the hoops formed by the circumferential strands 18 of the net layer 13.

When the entire length of the barrier section has been unrolled from its storage reel 39, the outer net layer 13 is released from the inner drum of the reel 39 by disengagement of the toggles 35 from the slotted plate. When the toggles 35 are released from their anchorage the final valve is actuated by its cord which is engaged with the slotted plate and is of sufficient length to allow the buoyancy unit 14 to be well clear of the structure of the reel 39 before inflation of the final buoyancy unit 14 takes place.

A feature of equipment in which this invention is embodied is its ability when the buoyancy units are inflated to be flexible but to remain as a cylinder without kinking or creasing, whilst at the same time being capable of overcoming as required the amplitude of the surface measurement of the water, i.e. the surface measurement of water in motion between two predetermined perpendicular points which is greater than that of the water in a state of flat calm. The flexibility of the barrier section is achieved by a combination of forces exerted by the vertibrae system of the buoyancy units 14 which exert a radiating and longitudinal force throughout the complete cylindrical structure of the section. The combination of the two forces are balanced to suit the environment by the geodetic arrangement of the outer net structure 13, which allows the expansion and contraction of the outer diameter in conjunction with a proportionate variation in length. Extending of the length is counteracted by the radial force of the buoyancy unit 14 and radial extension is countered by the longitudinal forces exerted by the buoyancy units 14 on each other. Each buoyancy unit 14 allows for movement with its neighbor. Friction between the units is prevented by the provision of the liner of low friction plastic material.

The prime object of the fibrous inner layer 12 is to provide protection of the buoyancy units 14 from the net 13 or other abrasive components that may come into contact with it. In addition to this role, the inner layer 12 performs a specially calculated function of waterlogging the structure to provide ballast to assist stability and provide controlled immersion of a predetermined draft in order that the unit would not be lifted out of the water by the action of wind or waves, and further, in combination with the net 13, to provide a high friction value surface for wave damping when liquids are impacted with the structure. Stability is futher enhanced by water within the cavities between juxtaposed buoyancy units 14, that water entering the cavities through the tubes 17.

Where a complete encircling barrier is not required, i.e. a barrier extending across the entrance of a harbor or an estuary, the alternative toggles forming the arrangement for end jointing may be connected upon themselves to seal off the end of the section.

In an alternative to the mesh structure described above with reference to FIGS. 3 and 4 of the drawings, the meshes may be diamond shaped and knotted, or alternatively, threaded through the multi-strands of the adjoining wires at their intersection, and in a further net a series of individual wires may be twisted and braided together at their intersections.

In a further design where a buoyant barrier section might not be subjected to contact with abrasive forces such as rocks, shore line irregularities, wrecked structures or ground contact as experienced in tidal conditions, the net may be constructed of man-made or natural fibers and might be of a knotted or braided knotless construction.

Figure 10:
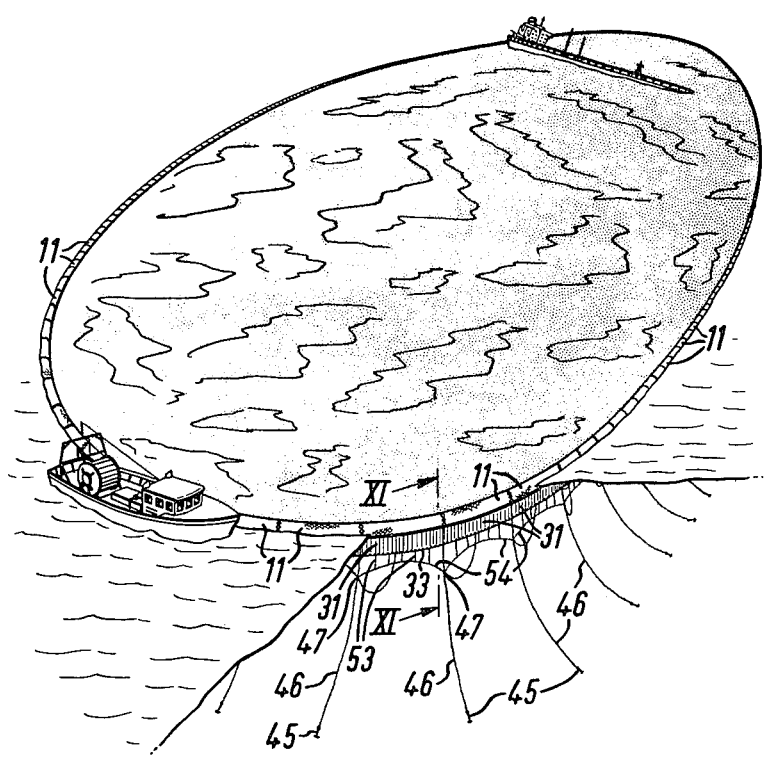
FIG. 10 is a perspective illustration of the laying of buoyant barrier sections in which this invention is embodied to form a barrier around an oil slick.

A typical practical application of the buoyant barrier section would be in providing a barrier to prevent surface oil floating away from a leaking oil tanker which may have run aground on off-shore rocks as shown in FIG. 10. A predetermined calculation would indicate the total catchment area required to hold the extent of the leakage and from this information the total length of the enclosing barrier would be calculated. The restraining barrier can be most easily placed in position by using large or small stern trawlers, coastal or inshore mine sweepers, or a decked fishing boat or small coastal cargo vessel. One or more pre-packed restraining booms on their self-contained bases may be loaded aboard a vessel where it would be lashed onto the deck to facilitate launching the barrier over the stern, or in the case of other vessels it might be lashed diagonally so that the barrier could be launched over the port or starboard quarter.

The operation commences with the laying of an appropriate anchor 45 which conveniently is at an end of a cable 46 consisting of an appropriate length of chain which is shackled at one end to the anchor, and a length of appropriate wire rope which in turn is shackled to a main mooring ring 47 of the barrier section. When the first anchor 45 is secured, the laying vessel may proceed slowly along its intended course, and the barrier section which is self-inflating will unroll from its storage reel 39. At predetermined points, dependent upon the circumstances, further anchors 45 are laid and attached to the barrier section. Before the first or any barrier section is cast off from the laying vessel it is first secured so that the storage reel 39 may be removed and a further brought forward so that the barrier sections may be joined by the toggles 35 and loops 34 provided at the extremities of each section. When the connection has been made the first section may be cast off and the process of laying the next continues until a sufficient number of sections have completed the desired encirclement. When this operation is complete a further set of anchors may be attached adjacent to the first anchors 45 in order to provide positive location of the barrier which if left to a single anchoring system would be subjected to a wide variation of locations occasioned by the movement of the tide and the scope of the anchorage cables which preferably would be three times that of the maximum depth of water in which they were situated.

Figure 11:
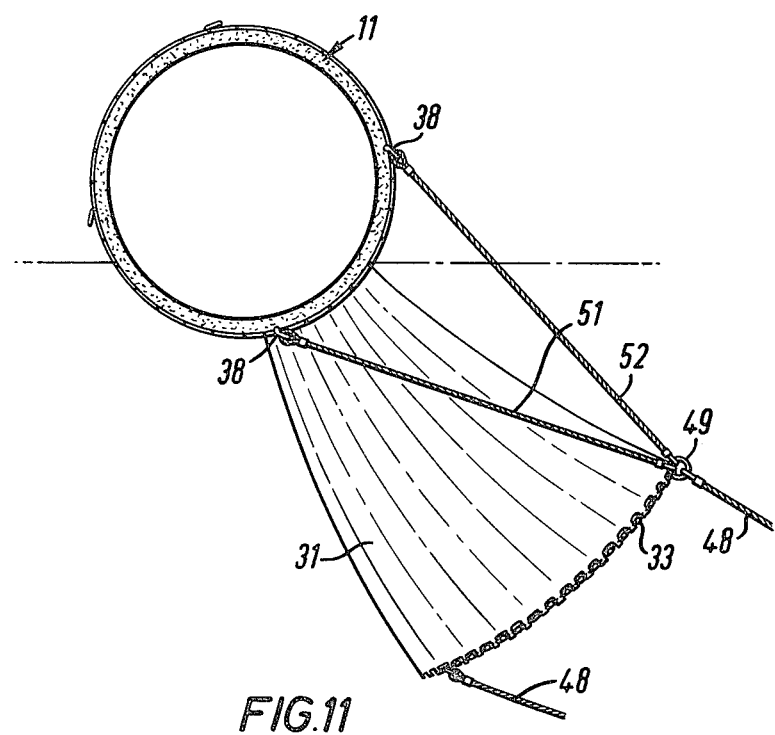
FIG. 11 is a section on the line XI—XI in FIG. 10.

FIG. 10 shows that each barrier section has a main mooring ring 47 connected to either end of its ballast chain 33. That connection is shown in more detail in FIG. 11 as comprising a short bridle rope 48 which connects the main mooring ring 47 to another ring 49 which is carried by the ballast chain 33, and which is also connected by a pair of bridle ropes 51 and 52 to a pair of the rings 38 on the outer net layer 12. At spaced intervals along the ballast chain 33 between each adjacent pair of rings 49, there are further rope rings from which, as shown in FIG. 10, short bridle ropes or flexible supporting ties 53 of different lengths extend to a headrope 54, which is an elongate flexible tension member and which extends in an arc between the main mooring rings 47. The headrope 54 serves to prevent the skirt 31 being swept under the barrier section by a tidal current.

A section of the barrier can be so laid and secured as to allow for its temporary removal for the purpose of admitting boats within the encircled area.

In a further application a barrier section may be stored ashore at a convenient point where a harbor or estuary may be closed off in the event of an emergency or to provide a contingency in a possible emergency. In this instance the barrier would be drawn across the harbor or estuary by a wire cable brought from the opposing shore, or it may be towed across by a suitable vessel, in either instance the operation of connecting a series of sections would be carried out ashore. The barrier when drawn across the harbor entrance or estuary would then be secured by anchors as previously described in the encircling procedure. Alternatively, pre-positioned anchorage buoys could be permanently in position for the specific purpose of coping with emergencies.

In a further application the barrier may be required to encircle a shore based spillage, or to encircle an oil carrying vessel that had run onto a shore line. To deal with this contingency it may be necessary to lay the barrier out to sea but with its ends coming ashore above the high water mark. Seepage of oil under the barrier where it was in contact with the shore for varying distances dependent upon a possible rise and fall of tides the cylindrical boom would be prevented by the skirt 31.

Attachment of the skirt 31 in a zig-zag pattern along the bottom of the net layer 13 allows the barrier section to vary in length without impedance by the skirt 31. Such unimpeded variation in length of the barrier section is also allowed by the arcuate form of the headrope 54 and, if desired, by an arcuate arrangement of the ballast chain 33.

At any time after the barrier has fulfilled its duty it may be drawn ashore or into a vessel where the air or gases are released by special valves from each buoyant compartment. The buoyancy units 14 and the high tensile multistrand net 13 may be returned to the manufacturer for cleaning and repacking.

The fibrous mat 12 may be taken ashore and burned or disposed of in any other convenient way.

When the section is serviced by the manufacturer a new fibrous mat 12 is packed into the structure in preparation for re-use.

The cross-section of the barrier section may be cylindrical or any other predetermined shape.

Each buoyancy unit may have a peripheral skirt at one end, the juxtaposed unit at that end being socketed into the cavity bounded by that skirt. The inner surface of the skirt would be lined with a low friction plastic material. Ingress and egress of water between the liner would be provided for by small perforations around the skirt.

The thickness of the straight strands 18 of the outer net layer 13 may be less than that of the other strands of the net to facilitate radial contraction of the tubular net layer 13 with longitudinal extension of that tubular layer 13.

I claim:

1. Elongate floatable equipment, comprising:
a plurality of discrete, independent, floatable buoyancy units; and
a sleeve comprising a net layer defining a flexible tubular casing, the net layer being made of a plurality of strands of a high tensile filamentary material, the buoyancy units being arranged into and accommodated within the sleeve, a series of circumferential hoops being defined by groups of the strands and being spaced from each other along the length of the tubular casing, the hoops being interlocked by additional strands which, together with the strands that define the hoops, are arranged as a geodetic network to limit radial expansion of the tubular casing while permitting both radial contraction of the tubular casing with proportionate increase in length of the tubular casing and radial expansion of the tubular casing to the extent allowed by the hoops with proportionate decrease in the length of the tubular casing.

2. A floatable boom which may be used in containing oil spills, said boom comprising:
a plurality of resiliently deformable, inflatable, discrete, independent, floatable buoyancy units; and
a sleeve comprising a tubular casing formed of a flexible material, said buoyancy units being arranged in end to end abutment along a longitudinal direction and accommodated within said sleeve, said sleeve being sufficiently flexible to allow said buoyancy units to be movable laterally relative to said longitudinal direction with respect to one another so as to permit the boom to follow consistently changing surface water conditions and remain substantially in contact with the water throughout its length.

3. A floatable boom which may be used in containing oil spills, said boom comprising:

a plurality of discrete, resiliently deformable, inflatable, independent, floatable buoyancy units; and a sleeve comprising a tubular casing of flexible material, said buoyancy units being arranged in end to end abutment and accommodated within said sleeve, said sleeve including a net layer adapted to limit radial expansion of said tubular casing while permitting both radial contraction of said tubular casing with proportionate increase in the length of said tubular casing and radial expansion of the tubular casing to a predetermined extent with proportionate decrease in the length of said tubular casing;

said sleeve being sufficiently flexible to allow said buoyancy units to be movable laterally relative to said tubular casing with respect to one another so as to permit the boom to follow consistently changing surface water conditions and remain substantially in contact with the water throughout its length.

4. A floatable boom according to one of claims 2 or 3, further comprising a liing of low friction material diagonal between said buoyancy units and said tubular casing.

5. A floatable boom according to one of claims 2 or 3, further comprising a skirt which is attached to the exterior of the tubular casing from the tubular casing when the equipment is floated on a body of liquid.

6. A floatable boom according to claim 5, wherein the tubular casing comprises a net layer made of a high tensile filamentary material, the net layer having lacing means for permitting it to be opened longitudinally along a zig zag line along the length of the tubular casing, and wherein the skirt is attached to the tubular casing by means of the lacing means.

7. A floatable boom according to claim 5, further comprising a plurality of anchor cable mooring rings disposed at spaced intervals along the sleeve, and a respective flexible supporting tie securing each anchor cable mooring ring to the sleeve; and further comprising a respective elongate flexible tension member interconnecting each pair of adjacent ones of the anchor cable mooring rings.

8. A floatable boom according to claim 7, further comprising additional rings each connected to a respective anchor chain mooring ring by a respective one of the supporting ties, each additional ring being fixed to the skirt edge and being connected to each of two spaced supporting locations on the net layer of the tubular casing by respective bridle rope means.

9. A floatable boom according to claim 7, further comprising additional flexible supporting ties which are disposed spaced along the length of and are connected to the edge of the skirt that is remote from the tubular casing, the length of each tie that is spaced from the center of the skirt edge being greater than that of the adjacent tie that is nearer to the center of the skirt edge.

10. A floatable boom according to one of claims 2 or 3, wherein each pair of adjacent buoyancy units cooperate to define a cavity between them, the cavity being surrounded by abutting peripheral portions of the end walls of the two units, and further comprising tubes by which respective ones of the cavities communicate with the exterior of the tubular casing, each tube extending through the tubular casing.

11. A floatable boom according to one of claims 2 or 3, wherein the buoyancy units are hollow, and the hollow of each buoyancy unit is not connected to the hollow of the other buoyancy units.

12. A floatable boom according to one of claims 2 or 3, wherein each buoyancy unit is inflatable independently of the other buoyancy units.

13. A floatable boom according to claim 12, further comprising automatically actuable inflation apparatus comprising a plurality of bottles each of which is for inflating a respective one of the inflatable buoyancy units, when its respective buoyancy unit is placed in a body of liquid.

14. A floatable boom according to claim 13, wherein each buoyancy unit has an outer end surface at each end thereof and has a concave portion defined in one of its outer end surfaces, and wherein said buoyancy unit has its respective bottle mounted on its outer surface in the concave portion thereof.

15. A floatable boom according to one of claims 2 or 3, wherein each buoyancy unit is made of an impervious material.

16. A floatable boom according to one of claims 2 or 3, wherein the tubular casing is stretchable.

17. A floatable boom according to claim 1, wherein the tubular casing comprises a net layer made of a high tensile filamentary material.

18. A floatable boom according to claim 17, wherein the net layer includes lacing means for permitting it to be opened longitudinally to facilitate removal of the buoyancy units.

19. A floatable boom according to claim 17, wherein the tubular casing also comprises an inner tubular layer of fibrous water absorbent material encased within the net layer.

* * * * *